Patented June 4, 1946

2,401,338

UNITED STATES PATENT OFFICE 2,401,338

TREATMENT OF VEGETABLE FATTY SUBSTANCES

Russell P. Dunmire, Shaker Heights, Ohio, assignor, by mesne assignments, to Buckeye Laboratories Corporation, Cleveland, Ohio, a corporation of Ohio No Drawing. Application September 23, 1941, Serial No. 412,049

19 Claims. (Cl. 260—428)

My invention is directed to the process for treating, purifying or re-refining fatty substances of the class consisting of vegetable oils and vegetable waxes.

All vegetable substances and particularly vegetable oils and waxes are subject to more or less deterioration when exposed to air, moisture, or other agents which cause contamination such as results from the formation of the products of oxidation, hydrolysis, polymerization, etc., as well as contamination by solid materials in suspension, and by liquid substances both in polyphase mixtures and solution.

An object of my invention is directed to the treatment and purification of the fatty substance of the class consisting of vegetable oils and waxes by subjecting the fatty substance to a process utilizing a combined action of adsorption and distillation.

Another object of my invention is directed to the process of re-refining contaminated or used vegetable fatty substances of the class consisting of oil and waxes to render same in a state of purification.

Another object of my invention is directed to the process of purifying a contaminated or used fatty substance of the class consisting of vegetable oils and waxes by subjecting same to a re-refining process utilizing a combined action of adsorption and distillation, wherein the high boiling point or substantially non-volatile impurities or undesirable constituents are removed by adsorption and the low boiling point volatile impurities or undesirable constituents are removed by distillation.

Another object of my invention is directed to the process of purifying a contaminated or used fatty substance of the class consisting of vegetable oils and waxes by subjecting same to a re-refining process utilizing the combined action of adsorption and distillation, wherein the distillation is carried out at a temperature in the range of the incipient azeotropic distillation point of the constituents comprising the vegetable substance.

Another object of my invention is directed to a process for purifying a contaminated or used fatty substance of the class consisting of vegetable oils and waxes wherein the process does not damage or materially change the characteristics of the vegetable oils or waxes being purified.

Another object of my invention is the process of purifying a contaminated or used fatty substance of the class consisting of vegetable oils and waxes under conditions to give a maximum yield.

The term "contaminated" as used herein and also in the claims means an oil or wax which is unfit for a specific purpose.

Other objects and a fuller understanding of my invention may be had by referring to the following description and claims:

In carrying out my process, the fatty substances are transferred to a suitable reaction vessel or container which is equipped with a mechanical agitator and which is arranged to be evacuated by any suitable means. The reaction vessel or container is also arranged to be heated for the purpose of carrying out the process. In other words, the reaction vessel or container comprises a retort provided with a mechanical agitator and is connected to a condensate receiver to carry out fractional distillation involved in the re-refining process. To the contaminated or used fatty substances I add a supply of solid adsorbent material in the retort or sealed container. The amount of the solid adsorbent material which is added to the retort chamber may vary with the particular type of fatty substance being treated and the process should be carried out under a sufficient amount of solid adsorbent material to effectively adsorb all of the adsorbable materials and impurities in the contaminated or used fatty substances. The solid adsorbent material may comprise bone char, carbon black, fuller's earth, etc. The combined mixture of the contaminated or used fatty substances and the adsorbent material is vigorously agitated by mechanical means in the retort under a vacuum preferably in the range of 28 inches to 30 inches of mercury as referred to a 30 inch barometer at sea level. In addition to the adsorbent material, an aqueous medium may be added in the form of water or steam as a sweeping agent.

Generally speaking, all vegetable fatty oils and waxes are mixtures of various fatty acids, glycerides or other esters. As such, they possess the properties of solution obeying Raoult's Law and are governed by the laws of distillation which apply to azeotropic mixtures. In the re-refining process comprising the combination of adsorption and distillation, I have found that the most satisfactory combination of property, color and yield is obtained when the fatty oil or wax is treated at a temperature at which azeotropic distillation of the mixture begins as evidenced by a collection of distillate in the distillate receiver; that is to say, at a temperature at which the first initial fraction of the fatty substance begins to distill off under the conditions of operation. This temperature at which the first initial fraction of the fatty substance begins to distill off will be referred to herein as the incipient azeotropic distillation point of the constituents of the vegetable substance being treated.

At temperatures materially below the incipient azeotropic distillation point a sufficiently high degree of purification is not obtained. At temperatures greatly beyond the incipient azeotropic distillation point the results are not completely satisfactory either from the standpoint of property and color of the re-refined product or from that of yield, or from both. The temperature range extends up to a value substantially 100° F. beyond the incipient azeotropic distillation point of the constituents of the fatty substance in its finally treated state and includes an elevated temperature in the range of the incipient azeotropic distillation point of the constituents of the fatty substance in its finally treated state and preferably embraces a range approximately 100° F. on either side of the incipient azeotropic distillation point of the constituents of the fatty substance in its finally treated state.

The treatment at temperatures in excess of approximately 100° F. beyond the incipient azeotropic distillation point leads to discoloration of the final product and also reduces the yield because of the losses by distillation of the fatty acids. The treatment at temperatures less than 100° F. below the incipient azeotropic distillation point, the yield is satisfactory but a sufficiently high degree of purification is not obtained because the maximum effect of the adsorbent is not attained in this low range of temperature.

The mechanical agitation or stirring of the combined mixture of the contaminated or used fatty substances and the adsorbent material in the sealed container brings all of the constituents thereof in close intimate physical contact and the adsorbent material thereby adsorbs the high boiling point impurities or constituents of the fatty substance being treated which are substantially non-volatile under the conditions of operation. The heating of the retort drives off substantially all of the low boiling point volatile impurities by distillation. The final mass in the retort after the heating and stirring is finished is then removed from the retort and filtered by any suitable means. The filtering separates the adsorbent material with the adsorbed impurities from the vegetable fatty substances being treated to recover the latter. The filter also removes any solid particles originally present in the contaminated or used vegetable fatty substances being treated.

For efficient operation, the time of the agitation may vary from 15 minutes to one hour or more depending upon the temperatures employed in the re-refining process, the amount of the adsorbent material employed, and the degree to which the fatty substances have been contaminated. The process may also be continuous or intermittent.

In considering the properties of a fatty substance, greatest importance is attached to saponification value, iodine value and acid value. The color of the re-refined product is of importance, since the appearance will indicate the absence or presence of appreciable quantities of oxidation products foreign to the normal characteristics of the fatty substance. Tables are given below showing comparisons of the properties of three representative vegetable oils when subjected to a process of re-refining utilizing a combined process of adsorption and distillation under vacuum. The oils selected are coconut, palmoil and soybean, as they are widely used in industry and commerce.

In Table I are given the results on a series of re-refining operations made on coconut oil at the temperatures shown in the column headings. In every case the treatment was carried out with substantially identical proportions of adsorbent, and under substantially identical conditions of vacuum which was maintained at substantially 29.75 inches of mercury. The difference in temperature noted were the only variables. In the first column are given the normal characteristics of the refined oil, as determined from a standard work of reference. The second column gives the characteristics for the contaminated oil before being subjected to the re-refining process. The oil being treated had become contaminated or was incompletely refined, and was considered to be unfit for the purpose for which it had been intended, namely, that of making a liquid soap which was intended to be completely clear and transparent.

TABLE I

*Coconut oil*

| | Normal characteristics | Original sample | Temperature | | | | | | |
|---|---|---|---|---|---|---|---|---|---|
| | | | 200° F. | 225° F. | 250° F. | 300° F. | 350° F. | 400° F. | 450° F. |
| Acid No. | 2.5–10.0 | 1.5 | 1.7 | 1.8 | 2.7 | 3.7 | 5.2 | 6.0 | 6.7 |
| Sap. No. | 253–262 | 245 | 249 | 254 | 256 | 245 | 244 | 235 | 235 |
| Color | | 2½ | 1½ | ½ | ½ | ½ | 1 | 1½ | 3— |
| Iodine No. | 6.2–10.0 | 10.8 | 10.1 | 9.6 | 8.3 | 8.0 | 7.2 | 6.5 | 4.9 |
| Condensate for azeotropic distillation _____percent | | | 0 | 0 | .33 | .67 | 1.0 | 1.7 | 6.0 |
| Yield of product _____do | | | 94 | 92 | 91 | 90 | 84 | 77 | 66 |

It will be observed that maximum yields of a product of excellent appearance and of desirable physical and chemical characteristics were obtained at those temperatures where azeotropic distillation at the pressure utilized was beginning; namely, approximately at 250° F. At temperatures greatly below this value, that is, below the incipient azeotropic distillation point, a desirable degree of purification was not obtained, while at temperatures greatly above this value, the same effects were observed insofar as refining was concerned, and in addition, the yields of product were greatly diminished.

The second table gives the results of a similar series of tests conducted on a greatly contaminated sample of palmoil. This oil had been used in the cold rolling of steel strip, and contained a considerable quantity of soluble metallo-organic compounds, as evidenced by the high amount of ash present in the samples. As before, substantially identical proportions of adsorbent were used in the treatments at various temperatures and the vacuum was substantially constant at the same value for Table I. The first column gives the normal characteristics of well-refined palmoil, and the second column gives the characteristics of the contaminated oil before being subjected to the re-refining process.

Consideration of the results of the three examples given has shown that in every instance there was a well defined temperature range, and this coincided with the temperature at which distillation commenced of the azeotropic mixtures of

TABLE II

*Palmoil*

|  | Normal characteristics | Original sample | 200° F. | 250° F. | 300° F. | 350° F. | 400° F. | 450° F. |
|---|---|---|---|---|---|---|---|---|
| Acid No | 5-22 | 24.6 | 23.9 | 22.8 | 23.0 | 23.3 | 23.7 | 24.4 |
| Sap. No | 200-205 | 193 | 195 | 196 | 196 | 196 | 199 | 203 |
| Color | Yellow | Black | Black | Brown | Brown | Brown | Brown | Brown |
| Iodine No | 49-59 | 55.7 | 55.5 | 55.0 | 54.6 | 53.2 | 52.0 | 50.4 |
| Ash per cent | Less than 0.10 | 3.45 | 3.24 | 2.91 | 2.49 | 2.27 | 1.96 | 1.54 |
| Condensate for azeotropic distillation do |  |  | 0 | 0 | .2 | .7 | 1.0 | 1.5 |
| Yield of product do |  |  | 95 | 94 | 90 | 87 | 82 | 78 |

The best yields of a product of greatly improved appearance and desirability were obtained, as in the preceding example, at those temperatures where azeotropic distillation of the mixture of fatty substances in the palmoil began; namely, approximately at 300° F. At temperatures greatly in excess of this, increase in acid value was observed, while a decrease was noted in the iodine value. The lowest value for ash was obtained at the highest temperature employed, but this was counterbalanced by the departures from normal of other characteristics. At temperatures much less than the incipient azeotropic distillation point, a satisfactory degree of improvement was not obtained.

Table III shows the results obtained when a series of re-refining treatments were carried out at various temperatures on a sample of soybean oil which was contaminated by being left in open containers and allowed free access to the atmosphere. The first column shows the usual properties of normal well-refined soybean oil as given in a standard reference work. The second column gives the characteristics of the contaminated soybean oil. In each of the subsequent columns, the results are given of the treatment of this oil by a process of re-refining consisting of adsorption and distillation where the proportion of adsorbent and the vacuum are held substantially constant, the same as Tables I and II, and where the differences in temperature noted were the only variables.

fatty compounds entering into the composition of the vegetable oils being treated. When low temperatures were employed, that is, temperatures at which no azeotropic distillation could occur under the conditions of operation, I have found that an insufficient degree of re-refining was obtained and that although some degree of improvement was observed much better results were obtained when the temperature was increased to a point where incipient azeotropic distillation was noted. Similarly, I have discovered that where very high temperatures were used, that is to say where a considerable degree of distillation of fatty products was involved, the results of the re-refining process were unsatisfactory, giving a yield which is uneconomically low, and a product which differs substantially from new well-refined oil in chemical characteristics and color. The range of operation for satisfactory results embraces approximately 100° F. on either side of the incipient azeotropic distillation point of the constituents of the fatty substance in its finally treated state. For coconut oil the range is approximately 150° F. to 350° F.; for palmoil, 200° F. to 400° F., and for soybean oil 250° F. to 450° F.

Although I have described my invention with a certain degree of particularity, it is understood that the present disclosure has been made only by way of example and that numerous changes may be resorted to without departing from the

TABLE III

*Soybean oil*

|  | Normal characteristics | Original sample | 200° F. | 250° F. | 300° F. | 350° F. | 400° F. | 450° F. |
|---|---|---|---|---|---|---|---|---|
| Acid No | 0.3-1.8 | 1.4 | 1.3 | 1.2 | 1.4 | 2.8 | 5.2 | 10.1 |
| Sap. No | 189-194 | 198 | 198 | 197 | 196 | 202 | 203 | 206 |
| Color | Pale straw | 3 | 1½ | 1- | 1- | 1 | 1½- | 2 |
| Iodine No | 122-134 | 131.3 | 130.1 | 130.0 | 128.8 | 125.1 | 122.3 | 118.0 |
| Condensate for azeotropic distillation per cent |  |  | 0 | 0 | 0 | .2 | .3 | .5 |
| Yield of product do |  |  | 96 | 96 | 90 | 86 | 80 | 75 |

Maximum yields of a product completely satisfactory in all respects was obtained at those temperatures where the smallest amounts of products of the distillation of azeotropic mixtures of fatty substances in the soybean oil were obtained; namely, approximately at 350° F. At temperatures much less than that, the product was unsatisfactory from the standpoint of purification. On the other hand, where the temperatures employed were greatly in excess of the incipient azeotropic distillation point, a grave deterioration of the product was noted, and yields were correspondingly low.

spirit and the scope of the invention as hereinafter claimed.

1. The process for removing impurities from a fatty substance of the class consisting of vegetable oils and waxes to restore the said fatty substance to substantially its normal composition, which process comprises mechanically mixing and agitating the fatty substance and a solid adsorbent material in a sealed container to adsorb the high boiling point impurities, heating the mixture of the fatty substance and the solid adsorbent material in the sealed container under vacuum at a temperature substantially in the range of the incipient azeotropic distillation point of the constituents of the fatty substance being treated to distill off the low boiling point volatile impurities, and separating the adsorbent material with its adsorbed impurities from the fatty substance being treated to recover the latter.

2. The process for removing impurities from a vegetable oil to restore the said vegetable oil to substantially its normal composition, which process comprises mechanically mixing and agitating the vegetable oil and a solid adsorbent material in a sealed container to adsorb the high boiling point impurities, heating the mixture of the vegetable oil and the solid adsorbent material in the sealed container under vacuum at a temperature substantially in the range of the incipient azeotropic distillation point of the constituents of the vegetable oil being treated to distill off the low boiling point volatile impurities, and separating the adsorbent material with its adsorbed impurities from the vegetable oil being treated to recover the latter.

3. The process for removing impurities from a vegetable wax to restore the said vegetable wax to substantially its normal composition, which process comprises mechanically mixing and agitating the wax and a solid adsorbent material in a sealed container to adsorb the high boiling point impurities, heating the mixture of the wax being treated and the solid adsorbent material in the sealed container under vacuum at a temperature substantially in the range of the incipient azeotropic distillation point of the constituents of the vegetable wax being treated to distill off the low boiling point volatile impurities, and separating the adsorbent material with its adsorbed impurities from the vegetable wax being treated to recover the latter.

4. The process for removing impurities from a fatty substance of the class consisting of vegetable oils and waxes to restore the said fatty substance to substantially its normal composition, which process comprises mechanically mixing and agitating the fatty substance, a solid adsorbent material and an aqueous medium of the class consisting of water and steam in a sealed container to adsorb the high boiling point impurities, heating the mixture of the fatty substance being treated, the adsorbent material and the aqueous medium in the sealed container under vacuum at a temperature substantially in the range of the incipient azeotropic distillation point of the constituents of the fatty substance to distill off the water and the low boiling point volatile impurities, and separating the adsorbent material with its adsorbed impurities from the fatty substance being treated to recover the latter.

5. The process for removing impurities from a vegetable oil to restore the said vegetable oil to substantially its normal composition, which process comprises mechanically mixing and agitating the vegetable oil, a solid adsorbent material and an aqueous medium of the class consisting of water and steam in a sealed container to adsorb the high boiling point impurities, heating the mixture of the vegetable oil being treated, the adsorbent material and the aqueous medium in the sealed container under vacuum at a temperature substantially in the range of the incipient azeotropic distillation point of the constituents of the vegetable oil to distill off the water and the low boiling point volatile impurities, and separating the adsorbent material with its adsorbed impurities from the vegetable oil being treated to recover the latter.

6. The process for removing impurities from a vegetable wax to restore the said vegetable wax to substantially its normal composition, which process comprises mechanically mixing and agitating the vegetable wax, a solid adsorbent material and an aqueous medium of the class consisting of water and steam in a sealed container to adsorb the high boiling point impurities, heating the mixture of the vegetable wax being treated, the adsorbent material and the aqueous medium in the sealed container under vacuum at a temperature substantially in the range of the incipient azeotropic distillation point of the constituents of the vegetable wax to distill off the water and the low boiling point volatile impurities, and separating the adsorbent material with its adsorbed impurities from the vegetable wax being treated to recover the latter.

7. The process for removing impurities from a coconut oil to restore the said coconut oil to substantially its normal composition, which process comprises mechanically mixing and agitating the coconut oil and a solid adsorbent material in a sealed container to adsorb the high boiling point impurities, heating the mixture of the coconut oil and the solid adsorbent material in the sealed container under vacuum at a temperature substantially in the range of the incipient azeotropic distillation point of the constituents of the coconut oil being treated to distill off the low boiling point volatile impurities, and separating the adsorbent material with its adsorbed impurities from the coconut oil being treated to recover the latter.

8. The process for removing impurities from a palmoil to restore the said palmoil to substantially its normal composition, which process comprises mechanically mixing and agitating the palmoil and a solid adsorbent material in a sealed container to adsorb the high boiling point impurities, heating the mixture of the palmoil and the solid adsorbent material in the sealed container under vacuum at a temperature substantially in the range of the incipient azeotropic distillation point of the constituents of the palmoil being treated to distill off the low boiling point volatile impurities, and separating the adsorbent material with its adsorbed impurities from the palmoil being treated to recover the latter.

9. The process for removing impurities from a soybean oil to restore the said soybean oil to substantially its normal composition, which process comprises mechanically mixing and agitating the soybean oil and a solid adsorbent material in a sealed container to adsorb the high boiling point impurities, heating the mixture of the soybean oil and the solid adsorbent material in the sealed container under vacuum at a temperature substantially in the range of the incipient azeotropic distillation point of the constituents of the soybean oil being treated to distill off the low boiling point volatile impurities, and separating the adsorbent material with its adsorbed impurities from the soybean oil being treated to recover the latter.

10. The process for removing impurities from a fatty substance of the class consisting of vegetable oils and waxes to restore the said fatty substance to substantially its normal composition, which process comprises mechanically mixing and agitating the fatty substance and a solid adsorbent material in a sealed container to adsorb the high boiling point impurities, heating the mixture of the fatty substance and the solid adsorbent material in the sealed container under vacuum at a temperature in a range which extends up to substantially 100° F. as a maximum beyond the incipient distillation point of the constituents of the fatty substance being treated to distill off the low boiling point volatile impurities, and separating the adsorbent material with its adsorbed impurities from the fatty substance being treated to recover the latter.

11. The process for removing impurities from a vegetable oil to restore the said vegetable oil to substantially its normal composition, which process comprises mechanically mixing and agitating the vegetable oil and a solid adsorbent material in a sealed container to adsorb the high boiling point impurities, heating the mixture of the vegetable oil and the solid adsorbent material in the sealed container under vacuum at a temperature in a range which extends up to substantially 100° F. as a maximum beyond the incipient distillation point of the constituents of the vegetable oil being treated to distill off the low boiling point volatile impurities, and separating the adsorbent material with its adsorbed impurities from the vegetable oil being treated to recover the latter.

12. The process for removing impurities from a vegetable wax to restore the said vegetable wax to substantially its normal composition, which process comprises mechanically mixing and agitating wax and a solid adsorbent material in a sealed container to adsorb the high boiling point impurities, heating the mixture of the wax being treated and the solid adsorbent material in the sealed container under vacuum at a temperature in a range which extends up to substantially 100° F. as a maximum beyond the incipient distillation point of the constituents of the vegetable wax being treated to distill off the low boiling point volatile impurities, and separating the adsorbent material with its adsorbed impurities from the vegetable wax being treated to recover the latter.

13. The process for removing impurities from a fatty substance of the class consisting of vegetable oils and waxes to restore the said fatty substance to substantially its normal composition, which process comprises mechanically mixing and agitating the fatty substance, a solid adsorbent material and an aqueous medium of the class consisting of water and steam in a sealed container to adsorb the high boiling point impurities, heating the mixture of the fatty substance being treated, the absorbent material and the aqueous medium in the sealed container under vacuum at a temperature in a range which extends up to substantially 100° F. as a maximum beyond the incipient distillation point of the constituents of the fatty substance to distill off the water and the low boiling point volatile impurities, and separating the adsorbent material with its adsorbed impurities from the fatty substance being treated to recover the latter.

14. The process for removing impurities from a coconut oil to restore the said coconut oil to substantially its normal composition, which process comprises mechanically mixing and agitating the coconut oil and a solid adsorbent material in a sealed container to adsorb the high boiling point impurities, heating the mixture of the coconut oil and the solid adsorbent material in the sealed container under vacuum at a temperature in a range which extends up to substantially 100° F. as a maximum beyond the incipient distillation point of the constituents of the coconut oil being treated to distill off the low boiling point volatile impurities, and separating the adsorbent material with its adsorbed impurities from the coconut oil being treated to recover the latter.

15. The process for removing impurities from a palmoil to restore said palmoil to substantially its normal composition, which process comprises mechanically mixing and agitating the palmoil and a solid adsorbent material in a sealed container to adsorb the high boiling point impurities, heating the mixture of the palmoil and the solid adsorbent material in the sealed container under vacuum at a temperature in a range which extends up to substantially 100° F. as a maximum beyond the incipient distillation point of the constituents of the palmoil being treated to distill off the low boiling point volatile impurities, and separating the adsorbent material with its adsorbed impurities from the palmoil being treated to recover the latter.

16. The process for removing impurities from a soybean oil to restore the said soybean oil to substantially its normal composition, which process comprises mechanically mixing and agitating the soybean oil and a solid adsorbent material in a sealed container to adsorb the high boiling point impurities, heating the mixture of the soybean oil and the solid adsorbent material in the sealed container under vacuum at a temperature in a range which extends up to substantially 100° F. as a maximum beyond the incipient distillation point of the constituents of the soybean oil being treated to distill off the low boiling point volatile impurities, and separating the adsorbent material with its adsorbed impurities from the soybean oil being treated to recover the latter.

17. The process for removing impurities from a coconut oil to restore the said coconut oil to substantially its normal composition, which process comprises mechanically mixing and agitating the coconut oil and a solid adsorbent material in a sealed container to adsorb the high boiling point impurities, heating the mixture of the coconut oil and the solid adsorbent material in the sealed container under a reduced pressure of substantially one pound per square inch absolute as a maximum and at a temperature in a range which extends up to substantially 350° F. as a maximum to distill off the low boiling point volatile impurities, and separating the adsorbent material with its adsorbed impurities from the coconut oil being treated to recover the latter.

18. The process for removing impurities from a palmoil to restore the said palmoil to substantially its normal composition, which process comprises mechanically mixing and agitating the palmoil and a solid adsorbent material in a sealed container to adsorb the high boiling point impurities, heating the mixture of the palmoil and the solid adsorbent material in the sealed container under a reduced pressure of substantially one pound per square inch absolute as a maximum and at a temperature in a range which extends up to substantially 400° F. as a maximum to distill off the low boiling point volatile impurities, and separating the adsorbent material with its adsorbed impurities from the palmoil being treated to recover the latter.

19. The process for removing impurities from a soybean oil to restore the said soybean oil to substantially its normal composition, which process comprises mechanically mixing and agitating the soybean oil and a solid adsorbent material in a sealed container to adsorb the high boiling point impurities, heating the mixture of the soybean oil and the solid adsorbent material in the sealed container under a reduced pressure of substantially one pound per square inch absolute as a maximum and at a temperature in a range which extends up to substantially 450° F. as a maximum to distill off the low boiling point volatile impurities, and separating the adsorbent material with its adsorbed impurities from the soybean oil being treated to recover the latter.

RUSSELL P. DUNMIRE.